United States Patent
Ernst et al.

(10) Patent No.: US 6,841,634 B1
(45) Date of Patent: Jan. 11, 2005

(54) MODIFIED SUPPORTED CATALYSTS FOR THE POLYMERIZATION OF OLEFINS

(75) Inventors: Eberhard Ernst, Schwechat-Mannswoerth (AT); Jens Reussner, Schwechat-Mannswoerth (AT); Per Roterud, Stathelle (NO); Kjell-Arne Solli, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 106 days.

(21) Appl. No.: 10/089,049

(22) PCT Filed: Oct. 2, 2000

(86) PCT No.: PCT/GB00/03775

§ 371 (c)(1),
(2), (4) Date: Jul. 11, 2002

(87) PCT Pub. No.: WO01/25296

PCT Pub. Date: Apr. 12, 2001

(30) Foreign Application Priority Data

Oct. 2, 1999 (EP) .............................. 99119575

(51) Int. Cl.⁷ ................ C08F 4/44; C08F 2/00
(52) U.S. Cl. .................. 526/160; 526/201; 526/904; 526/943
(58) Field of Search ................. 526/160, 201, 526/904, 943

(56) References Cited

U.S. PATENT DOCUMENTS

| 5,376,743 A | * 12/1994 | Baker et al. .................. 526/88 |
| 5,618,886 A | 4/1997 | Shinozaki et al. |
| 5,688,734 A | 11/1997 | Speca et al. |
| 6,225,252 B1 | 5/2001 | Ernst et al. |

FOREIGN PATENT DOCUMENTS

| EP | 0 279 863 B1 | 8/1988 |
| EP | 0 321 218 A2 | 6/1989 |
| EP | 0 517 183 A2 | 12/1992 |
| EP | 0 787 746 B1 | 1/1997 |
| WO | WO 94/28034 A1 | 12/1994 |
| WO | WO 96/28479 A1 | 9/1996 |
| WO | WO 97/02297 A1 | 1/1997 |
| WO | WO 97/27224 A1 | 7/1997 |
| WO | WO 99/24478 A1 | 5/1999 |

\* cited by examiner

*Primary Examiner*—Mark L. Bell
*Assistant Examiner*—J. Pasterczyk
(74) *Attorney, Agent, or Firm*—Nixon & Vanderhye P.C.

(57) ABSTRACT

A modified supported olefin polymerization catalyst modified by prepolymerization with an olefin or an olefin mixture different from the olefin or olefin mixture of the subsequent olefin polymerization. The polymerization catalyst is a metallocene, and the melting or softening point of the polyolefin made using the catalyst is at least 20° C. lower than that of the prepolymerized polyolefin.

14 Claims, No Drawings

MODIFIED SUPPORTED CATALYSTS FOR THE POLYMERIZATION OF OLEFINS

The invention relates to modified supported catalysts for the polymerization of olefins, for example based on single-site and multi-site metallocene catalysts, supported on inorganic or organic supports, or based on the Ziegler-Natta type catalysts.

Metallocenes of the metals of e.g. transition group IV of the Periodic Table of the elements are highly active catalysts for the polymerization of olefins. The resulting polyolefins have new advantageous combinations and supplement the product range of the polyolefins prepared hitherto using known conventional Ziegler-Natta catalysts.

It is known that catalysts based on unbridged, substituted and unsubstituted biscyclopentadienyl metallocenes in combination with aluminoxanes as cocatalyst can be used for the preparation of polyethylene and ethylene-olefin copolymers (EP 0 128 046).

It is also known that stereoregular polyolefins can be prepared using bridged, chiral-metallocenes. For bridging the ligand systems, use is mostly made of dimethylsilanediyl groups (EP 0 316 155), methylphenylsilanediyl groups (EP 0 320 762), ethylene groups (Brintzinger, J. Organomet. Chem. 288 (1985), 63–67) isopropylidene bridges (EP 0 459 264) and silyl-substituted diyl bridges (WO 97 02 276).

Depending on the ligand type and the substituents, isotactic, syndiotactic, hemiisotactic, stereoblock-type and atactic homopolymers and copolymers having aliphatic or cyclic structures can be prepared.

As ligands, preference is given to using substituted and unsubstituted cyclopentadienyl units (EP 316 155), substituted and unsubstituted indenyl units (EP a 302 424; EP 0 485 823) and also substituted and unsubstituted cyclopentadienyl units in combination with unsubstituted fluorenyl groups (EP 0 412 416).

It is further known that bridged metallocenes having a cyclopentadienyl system and a heteroatom ligand (constrained geometry catalyst) can also be used for the Polymerization of olefins (U.S. Pat. No. 5,096,867).

A disadvantage of such homogeneous catalysts in the Polymerization of olefins are the resulting powders, having only a low bulk density. The particle morphology of such products can in principle be somewhat improved by a specific pretreatment of the metallocene with the cocatalyst (EP 0 302 424). However, such a process has the disadvantage of, in particular, heavy deposit formation in industrial reactors (EP 0 563 917).

Although the use of methylaluminoxane, which is insoluble in aliphatic solvents, as support material gives a certain improvement in the activity and likewise leads to pulverulent products [Polymer 32(1991), 2671–2673]

Supporting the metallocene on oxidic materials such as silicon oxide or aluminium oxide with pretreatment of the starting material, which may be partially dehydrated, with the cocatalyst is a known method (WO 91 09 882) used in homopolymerization and copolymerization of ethylene. However, in this method, the particle size of the polymer particle is determined essentially by the particle size of the support material.

Oxidic support using methylaluminoxanes and the subsequent application of the metallocene (EP 0 206 794). However, this method restricts the ability to control the particle size by means of the properties of the support materials.

EP 0 685 494 describes a further supported catalyst which is prepared by the application of methylaluminoxane to a hydrophilic oxide, subsequent crosslinking of the methylaluminoxane using a polyfunctional organic crosslinker and subsequent application of an activated methylaluminoxane/metallocene complex. The disadvantage of this supported catalyst is that at the relatively high polymerization conversions achieved in industrial plants, the strength of the supported catalysts is not sufficient to ensure a compact, granular morphology of the polymer product.

A support material by drying hydrophilic inorganic oxides and reacting with aluminoxanes and polyfunctional crosslinkers gives, after contacting with catalysts, a supported catalyst system for a stable high bulk density in olefin polymerization even at high conversion rates (EP 0 787 746).

Methods for modifying homogeneous catalysts and supported catalyst systems by pre-polymerization are also known.

In EP 0 354 893 a homogeneous catalyst is prepared by pre-polymerizing a precipitated complex of an aluminium alkyl and a retallocene catalyst with an olefin monomer at a temperature below the polymerization temperature of the monomer, followed by polymerizing the olefin monomer under polymerization conditions. EP 0 426 638 describes the pre-polymerization of propylene in combination with homogeneous metallocene catalysts for reproducible and controllable polymerization. The disadvantage of homogeneous polymerization, resulting in powders having only a low bulk density, is not resolved in these processes.

For supported catalyst systems, pre-polymerization of olefinic monomers is known from EP 0 705 281 using bis-indenyl metallocene reaction product catalysts whereby the indenyl rings are 2-substituted, further from WO 97 02 297 wherein the pores of the catalyst system contain a volume of liquid that is equal to or less than the total pore volume of the supported catalyst system. In WO 96 28 479, a supported metallocene catalyst system having an activity greater than 100,000 g/g/h and at least an $\alpha$-olefin monomer are combined under pre-polymerization conditions, hydrogen is added, and after recovering the prepolymerized supported catalyst system, ethylene or propylene is fed for polymerization.

However, these pre-polymerizations generally use the same olefin or olefin mixture as the olefin or olefin mixture of the subsequent olefin polymerization, or in the case of WO 99 24 478 the pre-polymerized catalyst is used directly in the subsequent polymerization.

One of the main disadvantages of these known pre-polymerization processes is the impossibility to use the known metallocene supported catalysts necessary for the production of high molecular weight polyolefins without reactor fouling, formation of polymer fines resulting from soluble catalyst components and disrupted catalyst components in the initial phase of the olefin polymerization under technical liquid olefin polymerization conditions.

It is therefore an object of the invention to find a supported catalyst for liquid-phase polymerization of olefins for the production of high molecular weight polyolefins without reactor fouling, formation of polymer fines resulting from soluble catalyst components and disrupted catalyst components in the initial phase of the olefin polymerization.

It has now surprisingly been found, that these requirements are achieved by a modified supported olefin polymerization catalyst, characterised in that the catalyst is modified by pre-polymerization with an olefin or an olefin mixture different from the olefin or olefin mixture of the subsequent olefin polymerization.

The supported catalyst may be a metallocene catalyst, for example with one, two or three $\eta^5$ ligands bonding to a transition metal or lanthanide, preferably one or two $\eta^5$ ligands such as cyclopentadienyl, indenyl or fluorenyl. The $\eta^5$ ligands may be linked to each other by bridging groups, for example to yield a bridged bis-$\eta^5$ ligand. Where only one $\eta^5$ ligand is bonded to the metal, a pendant group on the ligand can also form a σ bond to the metal, a so-called "scorpionate" catalyst.

Ziegler-Natta catalysts are well known, and the invention may also be useful with other catalysts such as Philips (CrO$_x$) catalysts.

Metallocene catalysts may be classified as single-site or multi-site. Both may be coactivated by a cocatalyst, for example methyl aluminoxane, and may be supported on an inorganic or organic carrier. Ziegler-Natta catalysts, which are well known as multi-site catalysts, are supported by their nature.

The olefin used for the polymerization, different from the olefin of the subsequent polymerization, may be one or more of propylene, 1-butene, 3-methyl-1-butene, 3,3-dimethyl-1-butene, 3-methyl-1-pentene, 3-methyl-1-hexene, 3,4-dimethyl-1-pentene, 3,4-dimethyl-1-hexene, 1-pentene, 4-methyl-1-pentene, 4-methyl-1-hexene, 4,5-dimethyl-1-hexene, 4,4-dimethyl-1-pentene, 4,4-dimethyl-1-hexene, 6,6-dimethyl-1-heptene, vinyl cyclopropane, vinyl cyclobutane, vinyl cyclopentane, vinyl cyclohexane, vinyl cycloheptane, vinyl cyclooctane, allyl cyclopropane, allyl cyclobutane, allyl cyclopentane, allyl cyclohexane, allyl cycloheptane or allyl cyclooctane.

Preferred are one or more of propylene, 1-butene, 3-methyl-1-butene, 3,3-dimethyl-1-butene, 4-methyl-1-pentene, 4,4-dimethyl-1-pentene, 4,5-dimethyl-1-hexene, vinyl cyclopentane, vinyl cyclohexane, vinyl cycloheptane, allyl cyclopentane, allyl cyclohexane or allyl cycloheptane, whilst particulary preferred olefins are 3-methyl-1-butene, 4-methyl-1-pentene, vinyl cyclopentane and vinyl cyclohexane.

Typically the pre-polymerization will result in 0.001–5.0, e.g. 0.001–3.0 or 0.01–1.0 parts by weight relative to the catalyst and support of the polyolefin or olefin copolymer different from the polyolefin or olefin copolymer of the subsequent olefin polymerization.

The melting point or softening point of the polyolefin or olefin copolymer resulting from pre-polymerization is suitably at least 20° C., preferably 30° C. higher than the melting point or softening point of the polyolefin or olefin copolymer of the subsequent olefin polymerization.

One particular supported metallocene catalyst for olefin polymerization which may be modified according to the invention, especially for liquid-phase polymerization of olefins, comprises A) 90.0–99.9 parts by weight of a catalyst support based on a hydrophilic inorganic oxide of an element of main groups II to IV or transition group IV of the Periodic Table or a mixture or mixed oxide thereof, which catalyst support is obtainable by simultaneous reaction with aluminoxanes and with polyfunctional organic crosslinkers, B) 10–0.1 parts by weight of a metallocene compound of the formula I

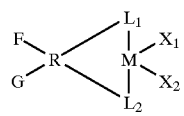

where

M is a metal selected from the group consisting of Ti, Zr, Hf, V, Nb and Ta or an element selected from the group consisting of the lanthamides, $X_1$ and $X_2$ are identical or different and are each a $C_1$–$C_{10}$ alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{20}$-alkylaryl group, a $C_7$–$C_{20}$-arylalkyl group, a $C_8$–$C_{20}$-arylalkenyl group, hydrogen or a halogen atom, $L_1$ and $L_2$ are identical or different and are each an unsubstituted, monosubstituted or polysubstituted monocyclic or polycyclic hydrocarbon radical containing at least one cyclopentadienyl unit which can form a sandwich structure with M, R is carbon, silicon, germanium or tin, F and G are identical or different and are each a trimethylsilyl radical of the formula—Si(CH$_3$)$_3$, where G may also be a $C_1$–$C_{10}$-alkyl radical, preferably a $C_1$–$C_4$-alkyl radical, or a $C_6$–$C_{10}$-aryl radical, whereby according to the invention said modified supported metallocene catalyst comprising the catalyst support A and the metallocene B has an activity of maximum 100 kg, preferably maximum 50 kg, particularly preferred maximum 20 kg polyolefin/g supported catalyst/h. It is also possible that the supported metallocene catalyst has an activity of maximum 5 kg or maximum 10 kg polyolefin/g supported catalyst/h.

The hydrophilic oxides used in the catalyst support usually contain hydroxyl groups and/or physically absorbed water. They are preferably porous and finely divided and usually have a mean particle size of from 10 to 300 microns.

Preferably the hydrophilic inorganic oxide is an aluminum oxide (alumina), silicon oxide (silica), magnesium oxide, titanium oxide or zirconium oxide or a mixture or mixed oxide thereof. Particular preference is given to using silicon dioxides of the Grace Davison type. However, other suitable starting materials are finely divided oxides, for example those described in EP 0 585 544, which are prepared by high temperature hydrolysis from gaseous metal chlorides or silicon compounds. Magnesium chloride is another suitable support material.

According to the present invention, the aluminoxane used in the catalyst support is a linear aluminoxane of the formula II

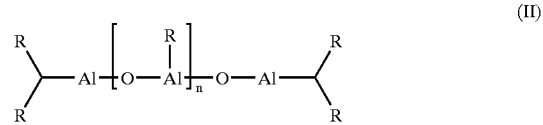

or an aluminoxane of the cyclic type III

where, in the formula II and III, the radicals R can be identical or different and are each a $C_1$–$C_6$-alkyl group and n is an integer in the range 150. Preferably, the radicals R are identical and are methyl, isobutyl, phenyl or benzyl. The aluminoxane can be prepared in various ways by known methods. One possibility is, for example, the reaction of aluminium alkyls with aluminium sulphate containing one water of crystallisation (EP 0 302 424).

In the catalyst support, the molar ratio of aluminium (as aluminoxane) to surface hydroxyl groups of the hydrophilic inorganic oxide is between 1 and 50, preferably between 1 and 30.

According to the invention, suitable polyfunctional organic crosslinkers in the catalyst support are all organic compounds having more than one functional group which can react with metal-carbon bond. Preference is given to using a bifunctional crosslinker. Such bifunctional organic compounds can be, for example, aliphatic or aromatic diols, aldehydes, dicarboxylic acids, primary or secondary diamines, diepoxy compounds.

Most preference is given to using aliphatic and aromatic diols, secondary amines or diepoxy compounds or mixtures thereof. Particular preference is given to using ethylene glycol, butanediol, bisphenol A and 1,4-butanediol diglycidyl ether. Tri- or higher functional crosslinkers which can be used are, for example, triethanolamine, glycerol, phloroglucinol or tetra-ethylenepentamine.

The molar ratio' between the aluminium as aluminoxane and the polyfunctional organic compound in the catalyst support can vary within a wide range and is between 1 and 100, preferably between 1 and 40. Higher molar ratios of aluminium to polyfunctional organic compound are used particularly when use is made of tri- or higher-functional crosslinkers which can form a correspondingly higher number of crosslinks.

According to the invention, preferred ligands L, and/or $L_2$ in the metallocene compound are substituted or unsubstituted cyclopentadienyl, indenyl or fluorenyl radicals. Particular preference is given to cyclopentadienyl, tetramethylcyclopentadienyl, indenyl, 2-methylindenyl, 2-methyl-4-phenylindenyl, 2-methyl-4,5-benzoindenyl and fluorenyl units and also ferrocene- and ruthenocene-substituted units as are described, for example, in EP 0 673 946.

According to the invention, the following metallocenes are particularly preferred:
bis(trimethylsilyl) silanediyldicyclopentadienylzirconium dichloride,
bis(trimethylsilyl) silanediyldiindenylzirconium dichloride,
bis(trimethylsilyl)silanediylbis(2-methylindenyl) zirconium dichloride,
bis(trimethylsilyl)silanediylbis(2-methyl-4,5-benzoindenyl) zirconium dichloride,
bis(trimethylsilyl)silanediylbis(2-methyl-4-phenylindenyl) zirconium dichloride,
bis(trimethylsilyl)silanediylbis(2-methyl-4-naphthylindenyl)zirconium dichloride,
bis(trimethylsilyl)silanediyldifluorenylzirconium dichloride,
bis(trimethylsilyl)silanediyl(fluorenyl) (cyclopentadienyl) zirconium dichloride,
bis(trimethylsilyl)silanediyl(fluorenyl) (indenyl) zirconium dichloride,
bis(trimethylsilyl)silanediyl(tetramethylcyclopentadienyl) (indenyl)zirconium dichloride,
methyl(trimethylsilyl) silanediyldicyclopentadienylzirconium dichloride,
methyl(trimethylsilyl)silanediyldiindenylzirconium dichloride,
methyl(trimethylsilyl)silanediylbis(2-methylindenyl) zirconium dichloride,
methyl(trimethylsilyl)silanediylbis(2-methyl-4,5-benzoindenyl)zirconium dichloride,
methyl(trimethylsilyl)silanediylbis(2-methyl-4-phenylindenyl)zirconium dichloride,
methyl(trimethylsilyl)silanediylbis(2-methyl-4-naphthylindenyl)zirconium dichloride,
methyl(trimethylsilyl)silanediyldifluorenylzirconium dichloride,
methyl(trimethylsilyl)silanediyl(fluorenyl) (cyclopentadienyl)zirconium dichloride,
methyl(trimethylsilyl)silanediyl(fluorenyl)(indenyl) zirconium dichloride and
methyl(trimethylsilyl)silanediyl (tetramethylcyclopentadienyl) (indenyl)zirconium dichloride.

According to the invention, in the metallocene compound in addition also amido, phosphido and arsenido radicals can be used as ligands $L_2$, where the substituents of these ligands are as defined for X, and X, or substituted or fused ferrocenyl- or ruthenocenyl-radicals.

The invention further provides a process for preparing the modified supported catalyst as hereinbefore described, comprising the step of modifying a supported olefin polymerization catalyst by pre-polymerization with an olefin or an olefin mixture different from the olefin or olefin mixture of the subsequent olefin polymerization, whereby the melting point or softening point of the polyolefin or olefin copolymer resulting from pre-polymerization is at least 20° C., preferably 30° C. higher than the melting point or softening point of the polyolefin or olefin copolymer, of the subsequent olefin polymerization.

The modified catalyst may be isolated from the modofication medium prior to use in the subsequent polymerization reaction.

In particular, a process for preparing a modified supported metallocene catalyst for polymerization of olefins, especially in liquid phase, comprises the steps:
α) preparing a catalyst support A) by
α1) drying a hydrophilic inorganic oxide of an element of main groups II to IV or transition group IV of the Periodic Table or a mixture or mixed oxide thereof at from 110 to 900° C., e.g. 110 to 800° C., subsequently
α2) if desired, reacting the free hydroxyl groups of the oxide completely or partially with aluminoxanes or aluminium alkyls and subsequently
α3) reacting the oxide simultaneously with aluminoxanes and polyfunctional organic crosslinkers,
β) suspending the catalyst support A) in an inert hydrocarbon and bringing it in contact with a solution of a metallocene compound B) of the formula I in an inert hydrocarbon, wherein 90.0–99.9 parts by weight of a catalyst support A) are mixed with 10–0.1 parts by weight of the metallocene compound B)

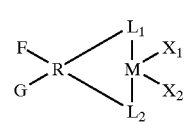

(I)

where
M is a metal selected from the group consisting of Ti, Zr, Hf, V, Nb and Ta or an element selected from the group consisting of the lanthamides,
$X_1$ and $X_2$ are identical or different and are each a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{20}$-alkylaryl group, a $C_7$–$C_{20}$-arylalkyl group, a $C_8$–$C_{20}$-arylalkenyl group, hydrogen or a halogen atom,
$L_1$ and $L_2$ are identical or different and are each an unsubstituted, monosubstituted or polysubstituted monocyclic or polycyclic hydrocarbon radical containing at least one cyclopentadienyl unit which can form a sandwich structure with M, R is carbon, silicon, germanium or tin,
F and G are identical or different and are each a trimethylsilyl radical of the formula —Si(CH$_3$)$_3$, where G may also be a $C_1$–$C_{10}$-alkyl radical, preferably a alkyl radical, or a $C_1$–$C_{10}$-aryl radical, γ) modifying said supported metallocene catalyst as defined above.

In the first stage α1), the oxide is preferably dehydrated in a stream of nitrogen or under reduced pressure at temperatures of from 110 to 800° C. or 900° C. over a period from 1 to 24 hours. The concentration of free hydroxyl groups, established as a function of the drying temperature selected, is then measured. The free hydroxyl groups can be reacted completely or partially with aluminoxanes or aluminium alkyls in stage α2).

In stage α3), the dried oxide is reacted simultaneously with aluminoxanes and at least one polyfunctional organic crosslinker, which is suspended, for example, in a suitable hydrocarbon solvent such as toluene in such a way that it is covered with the solvent. The solvents for the aluminoxane and for the crosslinker have to be miscible and the same solvents are preferable used. Particular preference is given to using toluene.

To prepare the solution needed in stage α3), the solvent used for the crosslinker can be the same as for the aluminoxane solution. Owing to the temperature dependence of the solubility of these crosslinkers in the solvent used, the desired concentration can be set in an targeted manner by the choice of the temperature of the solution. Particularly advantageous is the selection of a solvent whose boiling point is below the decomposition temperature of the solid prepared in stage α3). Preference is given to using aromatic solvents such as xylene, benzene or toluene.

When using the polyfunctional crosslinkers in preparing the catalyst support in stage α3), it is also possible, in a further reaction stage, to deactivate unreacted reactive groups using, for example, alkylaluminium compounds, preferably using trimethylaluminium.

The molar ratio between the aluminium used in stage α3) as aluminoxane and the crosslinker can vary within a wide range and is between 1 and 100, preferably between 1 and 40, particularly preferably between 10 and 25. It is dependent, in particular, on the type and pretreatment of the metal oxides, the type of aluminoxanes used, on the respective molar ratio of aluminium (as aluminoxane) to the surface hydroxyl groups on the metal oxide and on the type of crosslinker. Higher molar ratios of aluminium to the crosslinker are used particularly when use is made of tri- or higher functional crosslinkers which can form a correspondingly higher number of crosslinks.

The suspended dried oxide from stage α1) is preferably Treated with a solution of aluminoxane and a solution of one or more polyfunctional organic crosslinkers in the same solvent. If desired, it is also possible in stage α2) to react the free hydroxyl groups of the oxide with an up to equimolar amount of an aluminoxane or an aluminium alkyl solution, for example trimethylaluminium prior to the crosslinking reaction. Preference is given to using methylaluminoxane for this purpose. It has been found to be particularly advantageous if all hydroxyl groups have been reacted. However, even a partial reaction of these groups gives a positive effect.

According to the invention, in stage α3) for preparing the catalyst support, the metering in of the solutions is carried out simultaneously and continuously and the crosslinker solution may be heated or cooled if desired.

The temperature to which the solution is heated or cooled depends on the solubility of the crosslinker in the solvent selected and on the desired crosslinking density on the support surface. The rate at which the two streams are metered in can be set by means of metering pumps and is in a range between 0.1 and 1000 ml per minute, preferably between 0.5 and 250 ml per minute, particularly preferably between 1 and 50 ml per minute. The reaction is preferably carried out in such a way that all the aluminoxane has been reacted after the simultaneous metering in of the two solutions.

Under some circumstances, fluctuations in the reaction conditions on the industrial scale can be lead to unreacted aluminoxane remaining in the solution. The usable catalyst supports as described in EP 0 685 494 display a soluble aluminium proportion in the solvent wised of preferably less than 1.4 molt based on the aluminoxane used. In this case, it is possible to carry out one or more washing steps in order to reduce the concentration below the desired limit. It is also possible to add a further amount of alumoxane and to store the resulting suspension to improve the catalyst performance (DE-OS 19821370).

After addition of the reactants in stage α3) for preparing the catalyst support is complete, the reaction mixture is stirred further for about 60 minutes and the solvent is then removed. The residue can be dried under reduced pressure, but it is preferably used further in the moist state.

The metallocene compounds, used for the supported metallocene catalyst B are prepared by reacting metallocenes of the formula IV

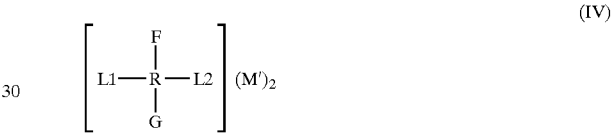

(IV)

where $L_1$, $L_2$, F, G and R are as defined for the formula I and M' is an alkali metal, preferably lithium, with a compound of the formula V

(V)

Where M, $X_1$ and $X_2$ are as defined for the formula I and X' is a halogen atom, preferably chlorine.

Preparing the metallocene compounds B), the reaction of the dimetallated compound of the formula IV with the metal halide of the formula V can be carried out, for example, as described in EP 0 659 756. However, the reaction of the dimetallated compound of the formula IV with the metal halide of the formula V is advantageously carried out in solvent mixtures of aromatic and/or aliphatic hydrocarbons, which may also be halogenated, with dialkyl ethers, preferably alkane/ether mixtures such as, for example, hexane/ether mixtures. Aliphatic hydrocarbons can be, for example, all $C_5$–$C_{12}$-alkanes. Preference is given to n-pentane, n-hexane, n-heptane or cyclohexane. Among the dialkylethers, preference is given to all di-$C_2$–$C_4$-alkyl ethers, for example diethyl ether, di-n-propyl ether, diisopropyl ether, di-n-butyl ether or tert-butyl-methyl ether. Examples of suitable halogenated hydrocarbons are all $C_1$–$C_4$-chloroalkanes. Particular preference is given to dichloromethane.

The preparation of the supported metallocene catalyst according to β is carried out by suspending the catalyst support A) in an inert hydrocarbon, preferably toluene, and bringing it into contact with the metallocene compound B). In this procedure, the metallocene compound is dissolved, for example, in an inert hydrocarbon. Inert solvents which can be used are, for example, aliphatic or aromatic hydrocarbons, preferably toluene. The metallocene compounds B) are preferably used in an amount of from 0.3 wt % to 5 wt a based on the total mass of the supported catalyst. The mixing time is from 5 minutes to 24 hours, preferably from 1 to 1 2 hours. The mixing is carried out at a temperature of from −10 to +80° C., in particular from 20 to 70° C.

The application of the metallocene compound B) is preferably carried out subsequent to the synthesis of the support A) in order to save a drying step. After the reaction is complete, the solvent is decanted and taken off under reduced pressure until a free-flowing solid remains.

According to the invention the pre-polymerization of the supported catalyst is carried out in absence of a solvent or in an inert hydrocarbon solvent. The pre-polymerization temperature is from particularly −20 to 25° C., preferably from 0 to 60° C. The treatment of the supported catalyst may be carried out under reduced, atmospheric or elevated pressure batchwise or continuously.

In a preferred embodiment the monomer feed during pre-polymerization reaction is at a rate from 0.05 to 20 g monomer/g supported catalyst/h, more preferably from 0.5 to 2 g monomer/g supported catalyst/h.

According to the invention, the pre-polymerization of these monomers in presence of the supported catalyst is carried out preferably in gas phase, although pre-polymerization by pore filling of a dry porous catalyst with liquid monomer, by slurry phase polymerization using oil or grease as a slurry medium or by slurry phase polymerization using an evaporatable hydrocarbon as slurry medium are also possible.

In a preferred embodiment especially for liquid-phase polymerization of propylene, the modification of the supported metallocene catalyst is carried out by pre-polymerization of 4-methyl-1-pentene.

The modified supported catalyst of the invention is polymerization-active without further activating additives. However, it has been found to be particularly advantageous to use aluminium alkyls, preferably trimethylaluminium, triethylaluminium or triisobutylaluminium, as scavenger and as additional activator. The amount is, based on the aluminium, 50–5000 mol, preferably 100–500 mol, per mol transition metal of the metallocene compound in the modified supported catalyst.

According to the invention the modified supported catalysts may be used for the polymerization of olefins or olefin mixtures, in particular $C_2$–$C_{16}$-α-olefins, preferably ethylene, propylene, 1-butene, 1-hexene, 1-octene, 4-methyl-1-pentene, cyclopentene, norbornene and/or norbornadiene. The modified supported catalysts make possible the preparation of homopolymers, copolymers and heterophasic copolymers. Most preferred is the use of the modified supported catalysts for the polymerization of propylene.

The invention further provides a process for preparing polyolefins by polymerization or copolymerization of olefins, wherein the polymerization catalyst used is a modified supported catalyst according to the invention.

In liquid phase polymerization, it is possible to use inert solvents, for example, aliphatic or cycloaliphatic hydrocarbons such as pentane, hexane or cyclohexane; toluene can also be used. Preference is given to carrying out the polymerization in the liquid monomer.

If required, hydrogen is added as molecular weight regulator. The total pressure in the polymerization is usually 0.5–150 bar. Polymerization is preferably carried out in the pressure range of 1–40 bar.

In the copolymerization of ethylene with propylene, the polymerization is preferably carried out in liquid propylene or in hexane as suspension medium. In the polymerization in liquid propylene, the ethylene is preferably fed in an amount such that a partial pressure ratio $P_{propylene}/P_{ethylene} > 0.5$, in particular $>1.0$, is established over the liquid phase ($P_{ethylene}$=partial pressure of the ethylene in the gas phase over the suspension; $P_{propylene}$ partial pressure of the propylene in the gas phase over the suspension). In the copolymerization in hexane as suspension medium, an ethylene/propylene gas mixture having a propylene content of from 1 to 50 mol %, preferably from 5 to 30 mol %, is fed in. The total pressure is kept constant during the polymerization by metering in a further amount. The total pressure is from 0.5 to 40 bar, preferably from 1 to 20 bar. The polymerization time is from 1 0 minutes to 6 hours, preferably from 30 minutes to 2 hours.

The modified supported catalysts make possible the preparation of high molecular weight polyolefins and olefin copolymers without reactor fouling, without formation of polymer fines resulting from soluble catalyst components and disrupted catalyst components in the initial phase of the olefin polymerization, especially under technical liquid polymerization conditions. Particle size and particle size distribution may be controlled in all stages of polymerization process. The polyolefins and olefin copolymers are obtained in granular form even at high polymerization conversions, they have a high bulk density and a low fines content.

The following examples illustrate the invention.

Abbreviations used are:

$^1$C-NMR $^{13}$C nuclear magnetic resonance spectroscopy
$d_{50}$ Mean particle diameter determined by sieve analysis
$^1$H-NMR $^1$H nuclear magnetic resonance spectroscopy
weight average molar mass in g/mol determined by GPC
$M_n$ Number average molar mass in g/mol determined by GPC
$M_w/M_n$ Polydispersity
MAO Methylaluminoxane
MC Metallocene compound MS mass spectrometry
$T_m$ Melting point determined by DSC
$cat_{pure}$ supported catalyst without pre-polymer
$cat_{pre-pol}$ pre-polymerized catalyst
$m_{cat}$ weight of the supported catalyst
$M_{pre-pol}$ weight of the pre-polymer
TEAL triethyl aluminium
MFR melt flow rate of PP in g/10 min measured at 230° C. using a weight of 2.16 kg
$MFR_2$ melt flow rate of PE in g/10 min measured at 190° C. using a weight of 2.16 kg
$MFR_{21}$ melt flow rate of PE in g/10 min measured at 190° C. using a weight of 21.6 kg
XS amount of polymer still soluble in xylene at 25 C after precipitation from high temperature solution

EXAMPLE 1

Preparation of the Catalyst Support

The silica (pore volume 1.58 cm³/g; surface area 300 m²/g) was dried at 200° C. using the procedure described in EP 787 746 Example 1. The OH content was 2.05 mmol/g $SiO_2$.

109.1 g of the dried oxide were suspended in 1.4 l of dry toluene in a three-neck flask equipped with a stirrer and two dropping funnels. In the first dropping funnel, 252 g (1298.3 mmol of Al) of a 309 strength solution of methylaluminoxane (MAO) in toluene were mixed with 740 ml of toluene and the second dropping funnel was charged with a solution of 12.25 g bisphenol A (53.72 mmol) in 613 ml oxygen-free toluene.

After 127.5 ml of the MAO solution had been initially introduced into the suspension at 55° C. within 15 minutes under moderate stirring, the two solutions were simultaneously added dropwise within approximately 40 minutes. The stirrer speed during this procedure was 200 rpm. The rate of dropwise addition was low and was selected such that both solutions were consumed at a suitable decrease in volume. The suspension was subsequently stirred for further three hours at 55° C. and was then allowed to stand. A fine white solid settled out. After pressurizing with 0.3 bar nitrogen, the cold suspension was stored for at least three weeks.

Subsequently the supernatant toluene was removed, the residue was again taken up two times with 800 ml toluene and washed for 15 minutes at 70° C. After separation of the white solid the supernatant washing solutions were removed. The resulting catalyst support suspension was directly used for the catalyst preparation.

EXAMPLE 2
Preparation of the Metallocene Compound 121 ml of a 1.5 molar methyllithium solution (180.3 mmol) are added under argon at −80° C. to a solution of 47.5 g (90.2 mmol) of 1,1,1,2-tetramethylbis(2-methyl-4-phenylindenyl)disilane (M. Kumada, J. Organomet. Chem. 43 (1972) 2931 in 400 ml of absolute diethyl ether. The reaction mixture is brought to room temperature over a period of 1 hour and stirred further for 20 hours at room temperature. After taking off the solvent in a high vacuum, a red-brown oily residue is obtained. This is admixed with 200 ml of absolute n-hexane, the resulting suspension is filtered under argon and the filtration residue is wash ed three times with absolute n-hexane. After drying for 30 minutes in a high vacuum, 46.6 g of the corresponding dilithium salt (96.0% yield) is obtained as an orange powder which is used without further purification for the synthesis of the zirconocene dichloride.

A suspension of 21.0 g of zirconium tetrachloride in 300 ml of absolute n-hexane is added at −80° C. to a solution of 46.6 g of the dilithium salt in 300 ml of absolute diethyl ether. After warming to room temperature over a period of two hours, the mixture is stirred for 20 hours at room temperature. After taking off the solvent in a high vacuum, the solid residue is washed twice with 100 ml absolute diethyl ether. The ether fractions are collected, the solvent is evaporated to a residual volume of 100 ml and the solution is cooled to −30° C. for a few days, yielding an amorphous product which is isolated by filtration. After 3 hours drying in vacuum, a 10.0 g amount of pseudoracmethyl (trimethylsilyl)-silanediyl (2-me thyl-4-phenylindenyl) zirconium dichloride (16.0% yield) is obtained. After further recrystallization from diehtylether at 30° C. a purity of 99% (11.0% yield) is reached.

$C_{36}H_{36}Si_2ZrCl_2$ (686.99 g/mol)
MS (EI, 30 eV) [m/z (%)]: 687 (14)
$^1$H-NMR (CD$_2$Cl$_2$) [ppm]: 0.62 (s, 9H, (C$\underline{H}_3)_3$Si—SiCH$_3$); 1.51 (s, 3H, (CH$_3)_3$Si—SiC$\underline{H}_3$); 2.26 and 2.32 (s, 3H, C$\underline{H}_3$-Ind); 6.95 to 7.62 (m, 18H, Ph/Ind-$\underline{H}$)

EXAMPLE 3
Preparation of the Supported Metallocene Catalyst

To 19.96 g of the catalyst support, prepared according to example 1, suspended in toluene (the solid is covered), a solution comprising 0.177 g of methyl(tri-methylsilyl)silanediylbis (2-methyl-4-phenylindenyl) zirconium dichloride, prepared according to Example 2 and 60 ml of toluene was added. The suspension became orange coloured and this colour became increasingly intense during the course of the stirring phase. After 16 hours, the stirrer was switched off. The catalyst was washed 2 times and the supernatant clear solution was decanted. Removal of the solvent at 50° C. under reduced pressure gave a red/orange finely divided solid.

The metallocene content was 0.9 wt %.

EXAMPLE 4
Propylene Polymerization Using the Supported Metallocene Catalyst

A 20 l stirred reactor was, after being made inert, charged at room temperature with 6.5 kg of liquid propylene and the mixture was stirred for 15 minutes at 200 rpm.

438 mg of the supported metallocene catalyst prepared in Example 3 were placed in the catalyst feeder.

Subsequently the powder was rinsed into the reactor using a further 500 g of propylene, the stirrer speed was increased to 400 rpm, the mixture was heated over a period of 12 minutes to the polymerization temperature of 70° C. and the temperature was kept constant. The reaction was stopped after two hours by flashing off the propylene. This gave 109.5 g of polypropylene with a fines content (<100 μm) determined by sieve analysis of 3.8% by weight. The activity was 0.25 kg/g cat$_{pure}$×2 h. The polymer particles were granular ($M_w$=604 kg/mol; polydispersity 2.9; $T_m$=153° C.) and the reactor showed deposits on the stirrer, the thermocouple and the wall above the liquid phase.

EXAMPLE 5
Modification of the Supported Metallocene Catalyst by Pre-Polymerization A modified thin-film evaporator was used for the pre-polymerisation. The evaporator was placed in a glove box and equipped with a powder flask that contained the catalyst powder. The system was connected with a second flask filled with oxygen and moisture free 4-methyl-1-pentene. 10 g of the catalyst prepared in example 3 were placed in the powder flask. The pressure was reduced to the vapour pressure of the monomer. 0.1 bar hydrogen was added. The polymerization conversion was followed by weighing the flask. After a polymerization time of one hour the weight ratio pre-polymer to catalyst ($m_{pre-pol}/m_{cat}$) was 0.4. Softening of the pre-polymer began at a temperature of 234° C.

EXAMPLE 6
Propylene Polymerization Using the Supported Metallocene Catalyst

A 20 l stirred reactor was, after being made inert with nitrogen, charged at room temperature with 6.5 kg of liquid propylene, 2 l hydrogen and with a 1 molar triethylaluminum/hexane solution and the mixture was stirred for 15 minutes at 200 rpm. The triethylaluminum/hexane solution was fed in such an amount that a TEAL/Zr molar ratio of 600 was adjusted.

260 mg of the umodified supported metallocene catalyst prepared according to Example 3 were mixed with the co-catalyst for 15 minutes. Subsequently the mixture was rinsed into the reactor using a further 500 g of propylene, the stirrer speed was increased to 400 rpm, the mixture was heated over a period of 12 minutes to the polymerization temperature of 70° C. and the temperature was kept constant. The reaction was stopped after two hours by flashing off the propylene. This gave 1536 g of polypropylene with a fines content (<100 μm) determined by sieve analysis, of 5 W by weight. The activity was 5.9 kg/g cat$_{pure}$×2 h. The polymer particles were granular ($M_w$=345 kg/mol; polydispersity 2.9; $T_m$=153° C.) and the reactor showed deposits on stirrer, thermocouple and the wall above the liquid phase.

EXAMPLE 7
Propylene Polymerization Using a 4-methyl-1-pentene Pre-Polymerized Catalyst The polymerisation was carried out by the method described in Example 6, but using 445 mg of the pre-polymerized catalyst of Example 5.

This gave 1938 g of polypropylene with a fines content (<100 μm) determined by sieve analysis of 1.2% by weight. The activity was 4.4 kg/g $cat_{pre-pol} \times 2$ h (6.1 kg/g $cat_{pure} \times 2$ h). The polymer particles were granular ($M_w$=324 kg/mol; polydispersity 2.8; $T_m$=153° C.) and the reactor showed no deposits on the internal fittings or the wall.

EXAMPLE 8
Propylene Polymerization using a 4-methyl-1-pentene Pre-Polymerized Catalyst The pre-polymerization was carried out by the method described in Example 5. The weight ratio pre-polymer to catalyst ($m_{pre-pol}/m_{cat}$) was 0.8. Softening of the pre-polymer began at a temperature of 232° C.

The polymerization reactor was charged with 295 mg of the pre-polymerized catalyst.

This gave 1663 g of polypropylene with a fines content (<100 μm) determined by sieve analysis of 1.5% by weight. The activity was 5.6 kg/g $cat_{pre-pol} \times 2$ h (10.1 kg/g $cat_{pure} \times 2$ h). The polymer particles were granular ($M_w$=355 kg/mol; polydispersity 2.8; T. =152° C.) and the reactor showed no deposits on the internal fittings or the wall.

EXAMPLE 9
Propylene Polymerization Using a 3-methyl-1-butene Pre-Polymerized Catalyst The pre-polymerisation was carried out by the method described in Example 5. The gaseous 3-methyl-1-butene was directly fed without dilution to the pre-polymerization reactor over a period of 4 hours. No hydrogen was used. The weight ratio pre-polymer to catalyst ($m_{pre-pol}/m_{cat}$) was 0.2. Softening of the pre-polymer began at a temperature of 301° C.

The polymerisation reactor was charged with 546 mg of the pre-polymerized catalyst.

This gave 1184 g of polypropylene with a fines content (<100 μm) determined by sieve analysis of 0.9% by weight. The activity was 2.2 kg/g $cat_{pre-pol} \times 2$ h (2.6 kg/g $cat_{pure} \times 2$ h). The polymer particles were granular ($M_w$=336 kg/mol; polydispersity 2.8; $T_m$=153° C.) and the reactor showed no deposits on the internal fittings or the wall.

EXAMPLE 10
Propylene Copolymerization Using a 4-methyl-1-pentene Pre-Polymerized Catalyst The pre-polymerization was carried out by the method described in Example 5. The weight ratio pre-polymer to catalyst ($m_{pre-pol}/m_{cat}$) was 0.8. Softening of the pre-polymer began at a temperature of 232° C.

The 20 l stirred polymerization reactor was, after being made inert, charged at room temperature with 6.5 kg of liquid propylene, 85 g ethylene, 21 hydrogen and with a 1 molar triethylaluminum/hexane solution and the mixture was stirred 15 minutes at 200 rpm. The triethyl-aluminum/hexane solution was fed in such an amount that a TEAL/Zr mole ratio of 600 w as adjusted.

The polymerization reactor was charged with 295 mg of the pre-polymerized catalyst.

The reaction was terminated after 30 minutes to limit the extent of conversion. The polymerization run gave 607 g of polypropylene copolymer with a fines content (<100 mm) determined by sieve analysis of 1.6 m by weight. The activity was 5.8 kg/g $cat_{pre-pol} \times 2$ h (10.4 kg/g $cat_{pure} \times 2$ h). The polymer particles were granular ($M_w$=280 kg/mol; polydispersity 2.8; $T_m$=142° C.) and the reactor showed no deposits on the internal fittings or the wall.

EXAMPLE 11
Mono-Site Catalyst Based on $Me_2Si(2\text{-Me-4-Ph-2-Ind})_2ZrCl_2$ and MAO 96 g $Me_2Si(2\text{-Me-4-Ph-2-Ind})_2ZrCl_2$, (as can be obtained from Boulder Scientific Company) and 8.6 kg toluene solution of 30 wt % MAO (as can be obtained from Albermarle) were mixed until solution and activation of the metallocene complex, and added slowly to 7 kg of silica, grade Sylopol 2104 (obtained from Grace), calcined at 800° C. The amount of liquid was less than the silica pore volume, hence the silica powder remained free floating and stirrable. The formed mono-site catalyst was dried under nitrogen to a toluene residual amount of 0.45 wt %, having bulk density of 330 kg/m³.

EXAMPLE 12
Prepolymerization Using Propylene 333 g of supported catalyst, Example 11, was placed in an inerted glass vessel, volume 3000 mL, equipped with a Teflon bladed stirrer. The vessel was connected to a steel cylinder containing a preweighed amount of liquid propylene. The catalyst vessel nitrogen atmosphere was replaced by gaseous propylene, and pressure from the propylene cylinder adjusted to 0.6 bar. The pressure was increased up to 1.5 bar during 3 hours 15 min at ambient temperature, until the propylene cylinder was emptied Weight of resulting prepolymerised catalyst was 424 g. The procedure was repeated for another two batches of catalyst, giving overall 1274 g prepolymerised catalyst from 963 g of pure catalyst.

EXAMPLE 13
Prepolymerisation Using 4-Me-1-pentene 332 g of supported catalyst, Example 11, was placed in an inerted glass vessel, volume 3000 mL, equipped with a Teflon bladed stirrer. The vessel was connected to another glass bottle containing 4-Me-1-pentene. The catalyst vessel was evacuated twice, each time refilled with gaseous 4-Me-1-pentene boiling off from the bottle, to substitute the nitrogen atmosphere. The 4-Me-1-pentene pressure in the catalyst vessel was then kept at 0.5 to 0.7 bar at ambient temperature for 4 hours, resulting in 449 g of prepolymerised catalyst. The procedure was repeated for another two batches of catalyst, giving overall 1330 g prepolymerised catalyst from 972 g of pure catalyst.

EXAMPLE 14
Polymerisation of Non Batch Prepolymerised Catalyst in Example 11

The catalyst prepared in Example 11 was dispersed to a 153 g/l oil/grease mixture (80+20 vol % of "Parafinium Liquidum 68" from Technol and "Vaselinfett Album" from Technol). The catalyst mud was then fed to a continuous process of two reactors in series: bulk propylene prepolymerisation (9 min residence time at 20° C.) and loop bulk propylene polymerisation (1.9 h residence time at 70° C.), 585 ppm of hydrogen and 0.1 g/kgpropylene of triethyl aluminum were present.

The catalyst productivity became 6.2 kg/gCat, or 3.2 kg/gCat*h. Process operability was bad. Inspection of the polymerisation reactor inner surface after 38 hours of operation showed sheeting and plugging from this catalyst. The powder samples, taken out of the lots and from the reactor, contained flat irregular shaped agglomerates with a diameter up to 1.5 cm. They appeared as sintered particles containing also fines. After reaching the target loop density these agglomerates caused loop reactor discharge problems.

Transparency and partly fused surface of particles were also observed. Product polymer analyses showed MFR= 30.5, XS=1.25 w %, $T_m$=152.1° C. Polymer powder bulk density was 0.456 g/ml.

EXAMPLE 15
Polymerisation of Propylene Prepolymerised Catalyst in Example 12

The catalyst prepared in Example 12 was dispersed to a 148.5 g/l oil/grease mixture (80+20 volt of "Parafinium Liquidum 68" from Technol and "Vaselinfett Album" from Technol). The catalyst mud was then fed to a continuous process of two reactors in series: bulk propylene prepolymerisation (9 min residence time at 20° C.) and loop bulk propylene polymerisation (1.3 h residence time at 70° C.), 620 ppm of hydrogen and 0.1 g/kgpropylene of triethyl aluminum were present.

The catalyst productivity became 4.8 kg/gCat$_{pure}$, or 3.5 kg/gCat$_{pure}$*h. Process operability was bad, although less severe than in Example 14. Inspection of the polymerisation reactor inner surface after 46 hours of operation showed plugging from this catalyst, but no sheeting and only few fine particle residues. The powder samples, taken out of the lots and from the reactor, contained flat irregular shaped agglomerates with a diameter up to 1.5 cm. They appeared as sintered particles containing also fines. After reaching the target loop density these agglomerates caused loop reactor discharge problems.

Transparency and partly fused surface of particles were also observed. Product polymer analyses showed MFR=38, XS=1.6 wt %. Polymer powder bulk density was 0.434 g/ml.

EXAMPLE 16
Polymerisation of 4-Me-1-pentene Prepolymerised Catalyst in Example 13

The catalyst prepared in Example 13 was dispersed to a 150 g/l/oil/grease mixture (80+20 vol % of "Parafinium Liquidum 68" from Technol and "Vaselinfett Album" from Technol). The catalyst mud was then fed to a continuous process of two reactors in series: bulk propylene prepolymerisation (9 min residence time at 15° C.) and loop bulk propylene polymerisation (1.4 h residence time at 70° C.), 670 ppm of hydrogen and 0.1 g/kgpropylene of triethyl aluminum were present.

The catalyst productivity became 6.36 kg/gCat$_{pure}$, or 4.54 kg/gCat$_{pure}$*h. Process operability was good, and morphology of powder particles, taken out of the lots and from the reactor, showed neither the transparency nor partly fused surface as noticed while using non batch prepolymerised catalyst in Example 14. Inspection of the polymerisation reactor inner surface after 3.5 days of operation did not show sheeting or plugging from this catalyst. Product polymer analyses showed MFR=283, XS=1.18 wt %, $T_m$=151.7° C. Polymer powder bulk density was 0.416 g/m.

EXAMPLE 17
Propylene Polymerisation Using a Non Batch Prepolymerized Catalyst 110 mg of the catalyst prepared in Example 11 was placed in a 2l inerted steel reactor, and 0.5 mmol TEAL (as 1 M heptane solution) and 0.24 bar hydrogen added. Thereafter 1300 ml liquid propylene was added, and 15° C. temperature maintained for 8 min. Temperature was then raised to 70° C. during 2 min, and maintained for 60 min. Polymerisation was terminated by flashing off the residual propylene. A yield of 340 g polypropylene was obtained. Activity was 4180 g/gCat$_{pure}$. There was no sheeting in the reactor, but a thin almost invisible sticky layer on reactor walls. Powder morphology was acceptable, although some agglomerates and a little fines.

Polymer analyses showed MFR=110, $T_m$=152.0° C., XS=1.1 wt %.

EXAMPLE 18
Prepolymerisation Using 1-hexene 10.08 g of supported catalyst, Example 11, was placed in an inerted glass vessel, volume 250 ml, equipped with a Teflon bladed stirrer. Pressure was reduced to 100 mbar and 1-hexene in a connected glass bottle was allowed to evaporate into the vessel through a steel tubing. The 1-hexene pressure in the vessel was ca 150 mbar at 25° C. The 1-hexene connection was closed after 143 min, and the residual 1-hexene removed by evacuation. The weight of prepolymerised catalyst was 11.07 g.

EXAMPLE 19
Propylene Polymerisation using a 1-Hexene Prepolymerized Catalyst 200 mg of the catalyst prepared in Example 18 was placed in a 2l inerted steel reactor, and 1.0 mmol TEAL (as 1 M heptane solution) and 0.2 bar hydrogen added. Thereafter 1300 mL liquid propylene was added, and 15° C. temperature maintained for 8 min. Temperature was then raised to 70° C. during 2 min, and maintained for 60 min.

Polymerisation was terminated by flashing off the residual propylene. A yield of 305 g polypropylene was obtained. Activity was 1670 g/gCat$_{pure}$. There was no deposits or sheeting in the reactor. Powder morphology was still good, although slightly more agglomerates but very little fines as compared to Example 17.

Polymer analyses showed MFR=26, $T_m$=152.4° C., XS=1.1 wt %.

EXAMPLE 20
Prepolymerisation Using 3-Me-1-butene 1.00 g of supported catalyst, Example 11, was placed in an inerted glass flask, volume 50 ml, equipped with a magnetic stirrer. A steel bottle containing 3-Me-1-butene (obtainable from Aldrich) was connected rising a needle through a septum. A pressure reduction valve was placed in between to control the pressure of 3-Me-1-butene. The flask was first flushed with 3-Me-1-butene to substitute the nitrogen, and then pressure was adjusted to 1.3 bar for 1 hour. The weight increase of the glass flask content was 0.25 g. Thereafter the steel bottle was tilted upside down, and 0.55 g of 3-Me-1-butene added as liquid. The 3-Me-1-butene connection was removed, and the glass flask was stored over the week-end without weight loss. Then the residual 3-Me-n-butene was removed by evacuation at 180 torr for 10 min. The weight of prepolymerised catalyst was 1.51 g.

EXAMPLE 21
Prepolymerisation Using 3,3-Me$_2$-1-butene 1.03 g of supported catalyst, Example 11, was placed in an inerted glass flask, volume 50 ml, equipped with a magnetic stirrer. A glass bottle containing 3,3-Me$_2$-1-butene (obtainable from Aldrich) was cooled in a refrigerator to −20° C., purged with nitrogen to remove traces of oxygen, and stored overnight on 13× molecular sieve. While using a syringe through a septum, 3,3-Me$_2$-1-butene was added batchwise to the catalyst containing glass flask until 0.78 g was accumulated. The glass flask was stored over the week-end without weight loss. Residual 3,3-Me$_2$-1-butene was removed by evacuation at 185 torr for 10 min. The weight of prepolymerised catalyst was 1.22 g.

EXAMPLE 22
Propylene Polymerisation Using a 3-Me-1-butene Prepolymerized Catalyst 160 mg of the catalyst prepared in Example 20 was placed in a 2 l inerted steel reactor, and 0,5 mmol TEAL (as 1 M heptane solution) and 0.24 bar hydrogen added. Thereafter 1300 ml liquid propylene was added, and 15° C. temperature maintained for 8 min. Temperature was then raised to 70° C. during 2 min, and maintained for 60 min. Polymerisation was terminated by flashing off the residual propylene. A yield of 410 g polypropylene was obtained Activity was 3870 g/gCat$_{pure}$. There were no deposits or sheeting in the reactor. Powder morphology was good, less agglomerates and only a little fines as compared to Example 17.

Polymer analyses showed MFR=55, T$_m$=152.0° C., XS=12 wt %.

EXAMPLE 23
Propylene Polymerisation Using a 3,3-Me$_2$-1-butene Prepolymerized Catalyst 130 mg of the catalyst prepared in Example 21 was placed in a 2 l inerted steel reactor, and 0.5 mmol TEAL (as 1 M heptane solution) and 0.25 bar hydrogen added. Thereafter 1300 ml liquid propylene was added, and 15° C. -temperature maintained for 8 min. Temperature was then raised to 70° C. during 2 min, and maintained for 60 min. Polymerisation was terminated by flashing off the residual propylene. A yield of 355 g polypropylene was obtained. Activity was 3230 g/gCat$_{pure}$. There were no deposits or sheeting in the reactor. Powder morphology was good, still some agglomerates but very little fines as compared to Example 17.

Polymer analyses showed MFR=80, T$_m$=152.0° C., XS=1.1 wt %.

EXAMPLE 24
Prepolymerisation Using 4-Me-1-pentene on a Ziegler-Natta MgCl$_2$-Supported Catalyst The Ziegler-Nacta MgCl$_2$-supported catalyst was synthesised following procedures given in patent EP-A-591224, essentially by spray crystallizing a magnesium chloride alcoholate followed by treatment with hot titanium tetrachloride, reacting with an 1,2-dicarboxylic ester, washing in a hydrocarbon and drying.

The catalyst was prepolymerised in an oil mud inside an inerted 50 ml glass bottle containing a magnetic stirrer. An amount of 0.300 g catalyst was dispersed into 14.66 oil, and 0.9 ml 0.5 M heptane solution of TEAL was added. Then 0.31 g of neat 4-Me-1-pentene was added, and the mud was stored over night. This oil mud was used for polymerisation without further treatment. Total weight of mud was 16.00 g, giving a cat$_{pure}$ concentration of 1.875 wt %.

EXAMPLE 25
Propylene Polymerisation Using a 4-Me-1-pentene Prepolymerized Z-N Catalyst 1.02 g of the catalyst mud prepared in Example 24 was placed in a 2 l inerted steel reactor, and 1.75 mmol TEAL (as 0.5 M heptane solution), 0.18 mmol cyclohexylmethyldimethoxysilane (as 0.2 M heptane solution), and 0.31 bar hydrogen was added. Thereafter 1300 ml liquid propylene was added, and 15° C. temperature maintained for 8 min. Temperature was then raised to 70° C. during 2 min, and maintained for 60 min. Polymerisation was terminated by flashing off the residual propylene. A yield of 300 g polypropylene was obtained. Activity was 15690 g/gCat$_{pure}$. There were no deposits or sheeting in the reactor. Powder morphology was good, less fines than in Example 26.

Polymer analyses showed MFR=3.5, T$_m$=162.7° C., XS=1.6 wt %.

EXAMPLE 26
Propylene Polymerisation Using a Non Batch Prepolymerised Z-N Catalyst The catalyst used for prepolymerisation in Example 24 was dispersed into a 2.00 wt oil mud. 0.89 g of this oil mud was placed in a 2 l inerted steel reactor, and 3.6 mmol TEAL (as 0.5 M heptane solution), 0.18 mmol cyclohexylmethyldimethoxysilane (as 0.2 M heptane solution), and 0.30 bar hydrogen was added. Thereafter 1300 mL liquid propylene was added, and 15° C. temperature maintained for 8 min. Temperature was then raised to 70° C. during 2 min, and maintained for 60 min. Polymerisation was terminated by flashing off the residual propylene. A yield of 260 g polypropylene was obtained. Activity was 14610 g/gCat$_{pure}$. There were no deposits or sheeting in the reactor. Powder morphology was acceptable, some fines.

Polymer analyses showed MFR=5.8, XS=1.7 w %.

EXAMPLE 27
Prepolymerisation Using 4-Me-1-pentene on a Ziegler-Natta Silica-Supported Catalyst The Ziegler-Natta silica-supported catalyst was synthesised following procedures given in patent EP-A-949274, essentially by precipitating magnesium chloride onto silica, reacting with titanium tetrachloride and evaporating the slurry medium.

The catalyst was prepolymerised in a oil mud inside an inerted 50 ml glass bottle containing a magnetic stirrer. 1.206 g catalyst and 1.25 mmol TEA (as 0.5 M heptane solution) were dispersed in oil to a total weight of 12.00 g. Then 1.0 g of neat 4-Me-1-pentene was added, and the mud was stored over night. This oil mud was used for polymerisation without further treatment. Total weight of mud was 13.0 g, giving a catpure concentration of 9.28 wt.

EXAMPLE 28
Ethylene Polymerisation Using a 4-Me-1-pentene Prepolymerized Z-N Catalyst 1.10 g of the catalyst mud prepared in Example 27 was placed in a 2 l inerted steel reactor, and 1.0 mmol TEAL (as 1 M heptane solution) added. A hydrogen pressure of 1.00 bar was added on top of 1.47 bar nitrogen pressure. Thereafter 650 mL liquid isobutane was added, and temperature stabilised at 80° C. Ethylene was then continously fed, and temperature and pressure controls adjusted to 29.7 bar total pressure at 90° C. Polymerisation was terminated after 47 min by closing the ethylene feed and flashing off the hydrocarbons. A yield of 425 g polyethylene was obtained. Activity was 4163 g/gCat. There were some deposits and sheeting in the reactor. Powder morphology was good, no fines. Polymer analyses showed MFR$_2$=0.39, MFR$_{21}$=12.6, density=0.9576 g/cm$^3$.

EXAMPLE 29
Ethylene Polymerisation Using a Non Batch Prepolymerised Z-N catalyst 98 mg of the catalyst used for prepolymerisation in Example 27 was mixed with 1.0 mmol TEAL (as 1 M heptane solution) and placed in a 2 l inerted steel reactor, and 1.02 bar hydrogen was added on top of 1.47 bar nitrogen pressure. Thereafter 650 ml liquid isobutane was added, and temperature stabilised at 80° C. Ethylene was then continously fed, and temperature and pressure controls adjusted to 30.7 bar total pressure at 90° C. polymerisation was terminated after 60 min by closing the ethylene feed and flashing off the hydrocarbons. A yield of 100 g polyethylene was obtained. Activity was 1020 g/gCat. There were no significant deposits or sheeting in the reactor. Powder morphology was good, although some agglomerates, no fines.

Polymer analyses showed MFPR$_2$=0.18, MFR$_{21}$=5.4, density=0.9549 g/cm$^3$.

What is claimed is:

1. A process for preparing polyolefins comprising
   (I) prepolymerising a supported olefin polymerization catalyst with an olefin or olefin mixture wherein the pre-polymerization olefin or olefin mixture is one or more of 1-butene, 3-methyl-1-butene, 3,3-dimethyl-1-butene, 4-methyl-1-pentene, 4,4-di methyl-1-pentene, 4,5-dimethyl-1-hexene, vinyl cyclopentane, vinyl cyclohexane, vinyl cycloheptane, allyl cyclopentane, allyl cyclohexane or alyll cycloheptane;
   (II) isolating the resulting prepolymerised olefin polymerisation catalyst; and
   (III) polymerising or copolymerising olefins in the presence of the prepolymerised olefin polymerisation catalyst;
   wherein the olefin or olefin mixture of the prepolymerisation is different from that of the subsequent olefin polymerisation or copolymerisation, wherein the melting point or softening point of the polyolefin or olefin copolymer resulting from prepolymerisation is at least 20° C. higher than the melting point or softening point of the polyolefin or olefin copolymer of the subsequent olefin polymerisation and wherein said olefin polymerisation catalyst is a metallocene.

2. A process as claimed in claim 1 wherein the melting point or softening point of the polyolefin or olefin copolymer resulting from prepolymerisation is at least 30° C. higher than the melting point or softening point of the polyolefin or olefin copolymer of the subsequent olefin polymerisation.

3. The process as claimed in claim 1 wherein the polymerization catalyst is two or more metallocenes forming a multi-site catalyst.

4. The process as claimed in claim 1, wherein for the liquid-phase polymerisation of polypropylene, in step (I) the supported catalyst is pre-polymerized with 4-methyl-1-pentene.

5. The process as claimed in claim 1 wherein the pre-polymerization olefin or olefin mixture is one or more of 3-methyl-1-butene, 4-methyl-1-pentene, vinyl cyclopentane or vinyl cyclohexane.

6. The process as claimed in claim 1 wherein the support material is silica.

7. The process as claimed in claim 1 wherein said olefin polymerisation catalyst is a supported metallocene catalyst, comprising
   A) 90.0-99.9 parts by weight of a catalyst support comprising a hydrophilic inorganic oxide of an element of main groups II to IV or transition group IV of the Periodic Table or a mixture or mixed oxide thereof, which catalyst support is obtained by simultaneous reaction with aluminoxanes and with polyfunctional organic crosslinkers reacted with the inorganic oxide to form the catalyst support,
   B) 10–0.1 parts by weight of a metallocene compound of the formula I

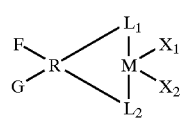
(I)

where
   M is a metal selected from the group consisting of Ti, Zr, Hf, V, Nb and Ta or an element selected from the group consisting of the lanthamides, $X_1$ and $X_2$ are identical or different and are each a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{20}$-alkylaryl group, a $C_7$–$C_{20}$-arylalkyl group, a $C_8$–$C_{20}$-arylalkenyl group, hydrogen or a halogen atom,
   $L_1$ and $L_2$ are identical or different and are each an unsubstituted, monosubstituted or polysubstituted monocyclic or polycyclic hydrocarbon radical containing at least one cyclopentadienyl unit which can form a sandwich structure with M,
   R is carbon, silicon, germanium or tin,
   F and G are identical or different and are each a trimethylsilyl radical of the formula —Si(CH$_3$)$_3$, where G may also be a $C_1$–$C_{10}$ alkyl radical, $C_6$–$C_{10}$-aryl radical,
   wherein the supported metallocene catalyst, comprising A and B, has an activity of maximum 100 kg, polyolefin/g supported catalyst/h.

8. The process as claimed in claim 1, wherein the pre-polymerization is carried out in gas phase.

9. The process as claimed in claim 1, wherein the pre-polymerization is slurry phase polymerization in an oil or grease slurry medium.

10. The process as claimed in claim 2 wherein the metallocene catalyst comprises two or more metallocenes forming a multi-site catalyst.

11. The process as claimed in claim 7, wherein the pre-polymerization is carried out in gas phase.

12. The process as claimed in claim 7, wherein the pre-polymerization is slurry phase polymerization in an oil or grease slurry medium.

13. The process of claim 7 wherein G is a $C_1$–$C_4$-alkyl radical.

14. A method of reducing reactor fouling during an olefin polymerisation comprising
   (I) prepolymerising a supported olefin polymerisation catalyst with an olefin or olefin mixture wherein the pre-polymerisation olefin or olefin mixture is one or more of 1-butene, 3-methyl-1-butene, 3,3-dimethyl-1-butene, 4-methyl-1-pentene, 4,4-dimethyl-1-pentene, 4,5-dimethyl-1-hexene, vinyl cyclopentane, vinyl cyclohexane, vinyl cycloheptane, allyl cyclopentane, allyl cyclohexane or allyl cycloheptane;
   (II) isolating the resulting prepolymerised olefin polymerisation catalyst; and
   (III) polymerising or copolymerising olefins in the presence of the prepolymerised olefin polymerisation catalyst;
   wherein the olefin or olefin mixture of the prepolymerisation is different from that of the subsequent olefin polymerisation or copolymerisation, and wherein the melting point or softening point of the polyolefin or olefin copolymer resulting from prepolymerisation is at least 20° C. higher than the melting point or softening point of the polyolefin or olefin copolymer of the subsequent olefin polymerisation.

* * * * *